United States Patent
Rowley

(10) Patent No.: US 7,725,563 B2
(45) Date of Patent: *May 25, 2010

(54) NESTED AND ROLES

(75) Inventor: Peter Andrew Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 359 days.

This patent is subject to a terminal disclaimer.

(21) Appl. No.: 11/712,312

(22) Filed: Feb. 27, 2007

(65) Prior Publication Data

US 2008/0208811 A1    Aug. 28, 2008

(51) Int. Cl.
G06F 15/16    (2006.01)

(52) U.S. Cl. .............................. 709/219; 709/223; 707/4

(58) Field of Classification Search .................. 709/219
See application file for complete search history.

(56) References Cited

U.S. PATENT DOCUMENTS

| | | | |
|---|---|---|---|
| 6,768,988 B2 | 7/2004 | Boreham et al. | |
| 6,785,686 B2 | 8/2004 | Boreham et al. | |
| 7,016,893 B2 | 3/2006 | Boreham et al. | |
| 7,016,907 B2 | 3/2006 | Boreham et al. | |
| 7,020,662 B2 | 3/2006 | Boreham et al. | |
| 7,130,839 B2 | 10/2006 | Boreham et al. | |
| 2003/0078937 A1* | 4/2003 | Boreham et al. | 707/102 |
| 2003/0088656 A1* | 5/2003 | Wahl et al. | 709/223 |
| 2003/0088678 A1* | 5/2003 | Boreham et al. | 709/228 |
| 2003/0105733 A1* | 6/2003 | Boreham et al. | 707/1 |
| 2003/0105742 A1* | 6/2003 | Boreham et al. | 707/2 |
| 2003/0115196 A1* | 6/2003 | Boreham et al. | 707/4 |
| 2004/0078368 A1* | 4/2004 | Excoffier et al. | 707/4 |
| 2004/0078391 A1* | 4/2004 | Excoffier et al. | 707/104.1 |
| 2005/0021498 A1* | 1/2005 | Boreham et al. | 707/1 |
| 2005/0171958 A9* | 8/2005 | Cheng et al. | 707/100 |
| 2006/0075251 A1* | 4/2006 | Correl et al. | 713/182 |
| 2007/0136237 A1* | 6/2007 | Barker et al. | 707/2 |
| 2007/0266006 A1* | 11/2007 | Buss | 707/3 |
| 2008/0147584 A1* | 6/2008 | Buss | 706/47 |

* cited by examiner

*Primary Examiner*—Firmin Backer
*Assistant Examiner*—Hamza Algibhah
(74) *Attorney, Agent, or Firm*—Blakely, Sokoloff, Taylor & Zafman LLP

(57) ABSTRACT

A method and apparatus for managing a nested AND role in a directory server is described. In one embodiment, a plurality of entries is defined in the directory server. At least one of the plurality of entries possesses a role. An entry is queried to determine its possessed role. A nested AND role possesses at least two roles. An entry possesses the nested AND role by possessing all the roles within the nested AND role.

15 Claims, 7 Drawing Sheets

500

\# example of a nested AND role dn: cn=patentagentrole, dc=example, dc=com
objectclass:nsRole
Objectclass:nsComplexRole
Objectclass:nsNestedRole
Objectclass:nsNestedANDRole
cn: patentagentrole
nsRoleDN: cn=legalrole, dc=example, dc=com
nsRoleDN: cn=engineerrole, dc=example, dc=com
description: Patent Agent Role within the company

502

NESTED AND ROLES

TECHNICAL FIELD

Embodiments of the present invention relate to a Lightweight Directory Access Protocol (LDAP), and more specifically to methods of grouping entries.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes, and each entry has an objectClass attribute containing named classes defined in the schema. The objectClass attribute may be multivalued, and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person". Membership in the "person" class would require the entry to contain the "sn" and "cn" attributes, and allow the entry also to contain "userPassword", "telephoneNumber", and other attributes.

A typical directory tree organizes entries hierarchically. This structure may not be optimal for short-lived or changing organizatios where groupins can be made basd on an arbitrary user attribute. Furthermore, in a conventional directory system, a client application is tasked with determining the type of groupings desired and with providing the logic for search requests to achieve the desired results. This makes client software more complex, reduces performance and brings the potential for errors on the client, either accidental or deliberate.

BRIEF DESCRIPTION OF THE DRAWINGS

The present invention is illustrated by way of example, and not by way of limitation, in the figures of the accompanying drawings and in which.

DETAILED DESCRIPTION

Figure 1:
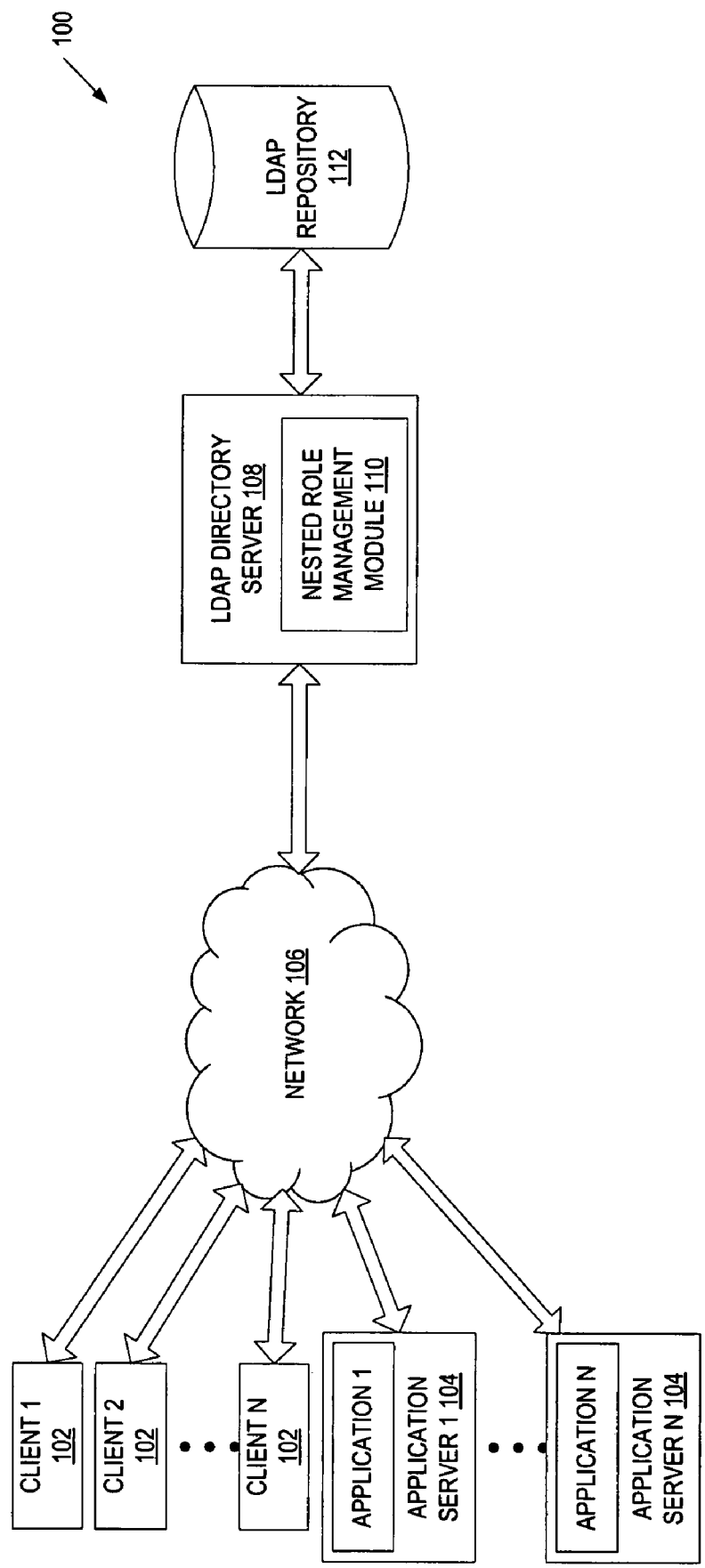
FIG. 1 illustrates a network architecture in which embodiments of the present invention may be implemented.

Described herein is a method and apparatus for enumerating entries that possess a nested AND role in a directory server is described. Roles are defined in the directory server. Each role comprises membership attributes for entries in the directory server. A nested AND role is defined as comprising at least two roles. Entries possess the nested AND role if they possess all the roles in the nested AND role.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

System Architecture

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 112 may be part of the LDAP directory server 108, or it may reside externally (e.g., on a database server). Server 108 may be a single server or a cluster of servers. The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP directory server 108 includes a role management module 110 that may be part of the LDAP directory server 108 or some other device and/or program, or be an independent module implemented in hardware, software or a combination thereof.

In one embodiment, the role management module 110 manages roles formed in the LDAP directory server 108. Roles may be used to define certain common characteristics of members of a group. A member may possess a role if the member has the corresponding nsRole attribute.

In accordance with one embodiment, the role management module 110 defines a plurality of entries in the directory server where one or more entries possesses a role. Role management module 110 also defines the nested AND role comprising at least two roles. Role management module 110 provides entries that possess the nested AND role to a client. The provided entries possess all the roles in the nested AND role in the LDAP directory server 108.

Overview of Static and Dynamic Groups

Groups are typically defined based on certain common characteristics of the members of the groups. A member can be included in a group if the member has an attribute of a specific type. Groups can be static or dynamic. A "static" group is one which where membership is specified by presence in a list.

A dynamic group is one where membership is inherent in some property of the entries. For example, a group containing a number of persons in a building might be "everyone on the third floor", and this would be defined by a filter (query) against the directory for "floor=3". As people are moved around the building, they may become part of the floor3 group, or leave it, depending on their location. A key feature of dynamic groups is that they require no explicit maintenance—a static group which is intended to contain everyone on the third floor would need to be maintained, either manually or by a script and so would be either prone to error or not always up to date. There are also implementation efficiency issues relating to static versus dynamic groups. Thus, in a dynamic group, instead of looking at a group attribute to verify if a user possesses the group attribute, membership is determined by checking a user attribute, which can be specified arbitrarily.

Overview of Roles

A role is a comprehensive entry grouping mechanism, similar to the group concept. Role unifies the concepts of static and dynamic groupings, but transfers some of the complexity to the server side from the client side. While dynamic groups contemplate a hierarchical tree-like structure of an organization, roles assume that logically an organization structure could be substantially flat or hierarchical.

The directory system expresses the fact that an entry possess a role by placing the Distinguishing Name (DN) of the role in a computed and operational attribute, for example, the nsRole attribute. A computed attribute is one that is computed on the fly; it is a result of a computation. A computed attribute does not need to exist in a physical form; it can be stored temporarily in memory. An LDAP operational attribute is one that is available only if requested. The attribute nsRole is both computed and operational.

Each entry assigned to a role contains an attribute called nsRole, which is a computed attribute that specifies all of the roles to which an entry belongs. Roles enable applications to locate the roles of an entry, rather than select a group and browse the members list. Additionally, roles allow for support of generated attribute values, and directory server-performed membership verification for clients. By changing a role definition, a user can change an entire organization with ease. Moreover, roles can use the LDAP Virtual List View (VLV) control mechanism to enumerate the membership in a role.

A role is defined by a role definition entry. A role is uniquely identified by the distinguished name (DN) of its defining entry. Role definition entries are implemented as LDAP sub-entries. Thus, a role definition entry inherits sub-entry mechanism for scope of application to a directory information tree (DIT) subtree. An aspect of a role is that each role is defined by an entry stored in the DIT. Any client or program executing on the client with appropriate access privileges can discover, identify and examine any role definition. Any client or client program with an appropriate access privilege can add a new role definition, or modify existing role definitions. Further, role definitions can be replicated in a distributed environment.

Each role has entries called "members." Members of a role are said to "possess" the role. Two varieties of roles are possible: simple roles, and complex roles. This classification, in one aspect, allows for implementation efficiency and supports some management functions. A client application can perform the following operations on roles:

(1) Enumerate the members of the role.

(2) Obtain an enumerated list of role members, which can be useful for resolving queries for group members quickly.

(3) Determine whether a given entry possesses a particular role.

(4) Determine the roles possessed by an entry, which can help a client-side application to determine whether the entry possesses the target role.

(5) Enumerate all the roles possessed by a given entry.

(6) Assign a particular role to a given entry.

(7) Remove a particular role from a given entry.

A client application can check role membership by searching the nsRole attribute, which is computed by the directory server and therefore is up-to-date. From the point of view of a client application, the method for checking membership is uniform and is performed on the server side.

Roles and Dynamic Groups

One of the differences between roles and dynamic groups is that dynamic groups impose a requirement on a directory client program to retrieve and correctly process the group definition. This makes client software more complex, reduces performance and brings the potential for errors on the client, either accidental or deliberate. Roles introduce an abstract membership test mechanism which allows responsibility for membership to rest with the directory server. The client only has to know the name of a role which is of interest to it, and how to test role membership in general.

Role is a more flexible entry grouping method than dynamic groups in part because a role allows a client to obtain the results normally obtained using static or dynamic groups without increased client complexity. A role can be configured in a number of ways to provide different results.

Role Operations

Given Arbitrary Roles and Entries, the Following Operations are Useful to Clients 1. Enumerate the members of a role (i.e., provide an answer to the question, "which entries have this role?") It is also useful to be able to resolve this query in a reasonable time (significantly less than the time to find the members by brute force examination of all the entries). It is also useful to be able to retrieve the entries in a paged or browsing fashion, using the existing LDAP VLV mechanism.

2. Determine whether a given entry possesses a particular role. It is useful to be able to do this more efficiently than by determining all the roles possessed by the entry and then checking whether the target role is among that set of roles.

3. Enumerate all the roles possessed by a given entry.

4. Assign a particular role to a given entry.

5. Revoke a particular role from a given entry.

Nested Role

A nested role is a container of other roles. To nest, the DNs corresponding to the roles are added or encapsulated to form the nested role. A "nested" role can be configured to provide an additional level of abstraction by nesting different role types—filtered, managed, enumerated or nested—where an entry can be a member of any one of the roles in the nesting. Nested roles allow a user to create roles that contain other roles. A nested role can be created with no members nested. Alternatively, a nested role may contain one or more members. It should be noted that the nesting or encapsulation is performed if (1) the target entry is within the scope of the role; and/or (2) target entry is within the scope of the role that causes the target entry to possess the nested role.

For example, if a target entry possesses a manager role, then it also possesses a megamanager role. Likewise, if a target entry possesses network manager role, then it also possesses the megamanager role. These two roles, sales manager role and network manager role are nested within the megamanager role. There can be an arbitrary number of nested within the megamanager role. In this example, an object class nsNestedRole defines the megamanager role to be a nested role. Included in this nesting are the two roles—sales manager and network manager—possessed by the megamanager role. It should be noted that an entry cannot be assigned a nested role. An entry may possess a nested role by also possessing a role which is nested within the nested role.

In an E-mail application, suppose one wishes to send a message to both sales managers and network managers. Assume further that the sender is aware of the E-mail address of the megamanager role. With nested role, the E-mail can be directed toward the megamanager role, and all roles that are nested within the mega manager role—in this example, all sales managers and all network managers—will receive a copy of the E-mail. To do this the application has only to test to ensure that the candidate entry to whom it sends the E-mail possesses the megamanager role, and not the particular role, whether sales manager or network manager. In the case of static groups, the client application has to interpret a group to decide whether an entry is a member of the group. In the case of roles, there is no need to do this. It is sufficient to test for the role value in the nsRole attribute. The roles nested within the nested role are specified using the nsRoleDN attribute.

Defining a Nested Role

Figure 2:
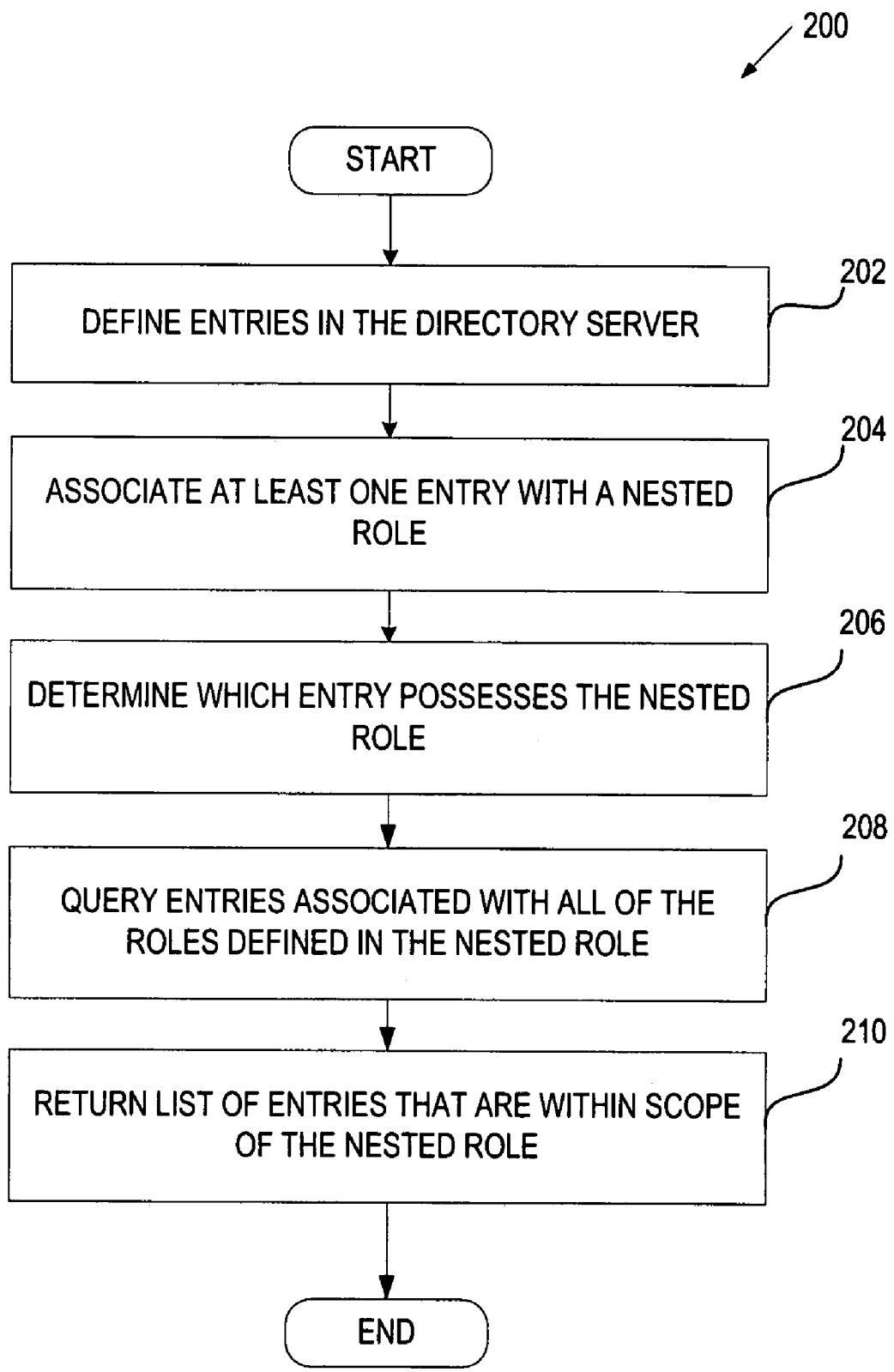
FIG. 2 illustrates a flow diagram of one embodiment of a method for enumerating entries that possess a nested AND role in a directory server.

Suppose a user wishes to create a role that contains both the marketing staff and sales managers contained by the roles created in the previous examples. A nested role created using the script "ldaomodify" may appear as follows:

dn: cn=MarketingSales,ou=people,dc=siroe,dc=com changetype: add objectclass: top objectclass: LDAPsubentry objectclass: nsRoleDefinition objectclass: nsComplexRoleDefinition objectclass: nsNestedRoleDefinition cn: MarketingSales nsRoleDN: cn=SalesManagerFilter,ou=people,dc=siroe, dc=com nsRoleDN: cn=Marketing,ou=people,dc=siroe,dc=com Nested AND Roles In accordance with one embodiment, an entry may possess a nested AND role by possessing all of the roles within the nested AND role. FIG. 2 illustrates a flow diagram of one embodiment of a method 200 for enumerating entries that possess a nested AND role in a directory server. The method may be performed by processing logic that may comprise hardware (e.g., circuitry, dedicated logic, programmable logic, microcode, etc.), software (such as instructions run on a processing device), or a combination thereof. In one embodiment, method 200 is performed by the role management module 110 of the LDAP directory server 108 of FIG. 1.

Referring to FIG. 2, at block 202, a processing logic of the LDAP directory server 108 defines entries in the directory server. In particular, one or more of the entries possesses a role. At block 204, an entry may possess a nested AND role. The nested AND role may be defined as comprising at least two roles in the directory server. At 206, a query may be received to determined which entry(ies) possesses the nested AND role. At 208, a query is performed to determine the role(s) possess by each entry. At 210, a list of entries that are within the scope of the nested AND role is returned. In accordance with one embodiment, entries may possess the nested AND role if they possess all of the roles within the nested AND role.

Figure 3:
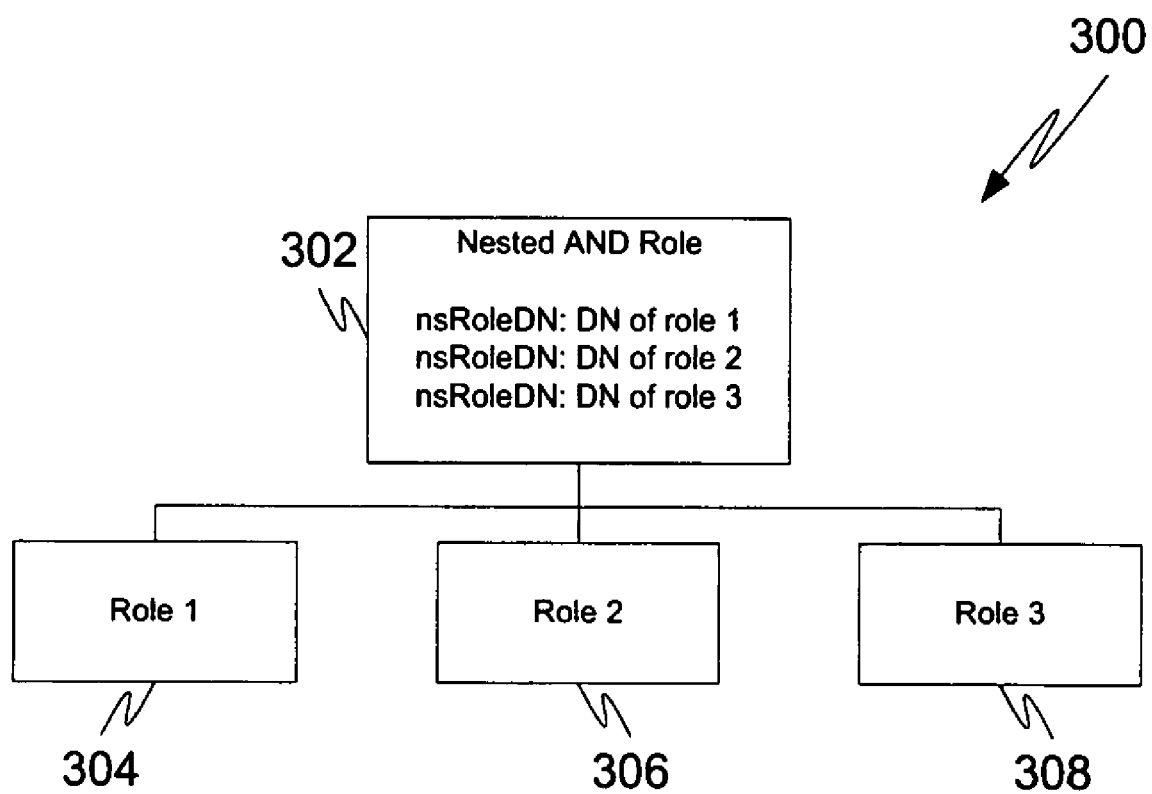
FIG. 3 illustrates a block diagram of an example of a nested AND role of a directory server.

FIG. 3 illustrates a block diagram 300 of an example of a nested AND role of a directory server. A nested AND role 302 may comprise two or more roles. For example, nested AND role 302 may specify the DN of role 1 304, role 2 306, and role 3 308. In order for an entry to possess the nested AND role, the entry must possess all the roles defined in the nested AND role. In other words, the entry must also posses all together role 1 304, role 2 306, and role 3 308.

Figure 4:
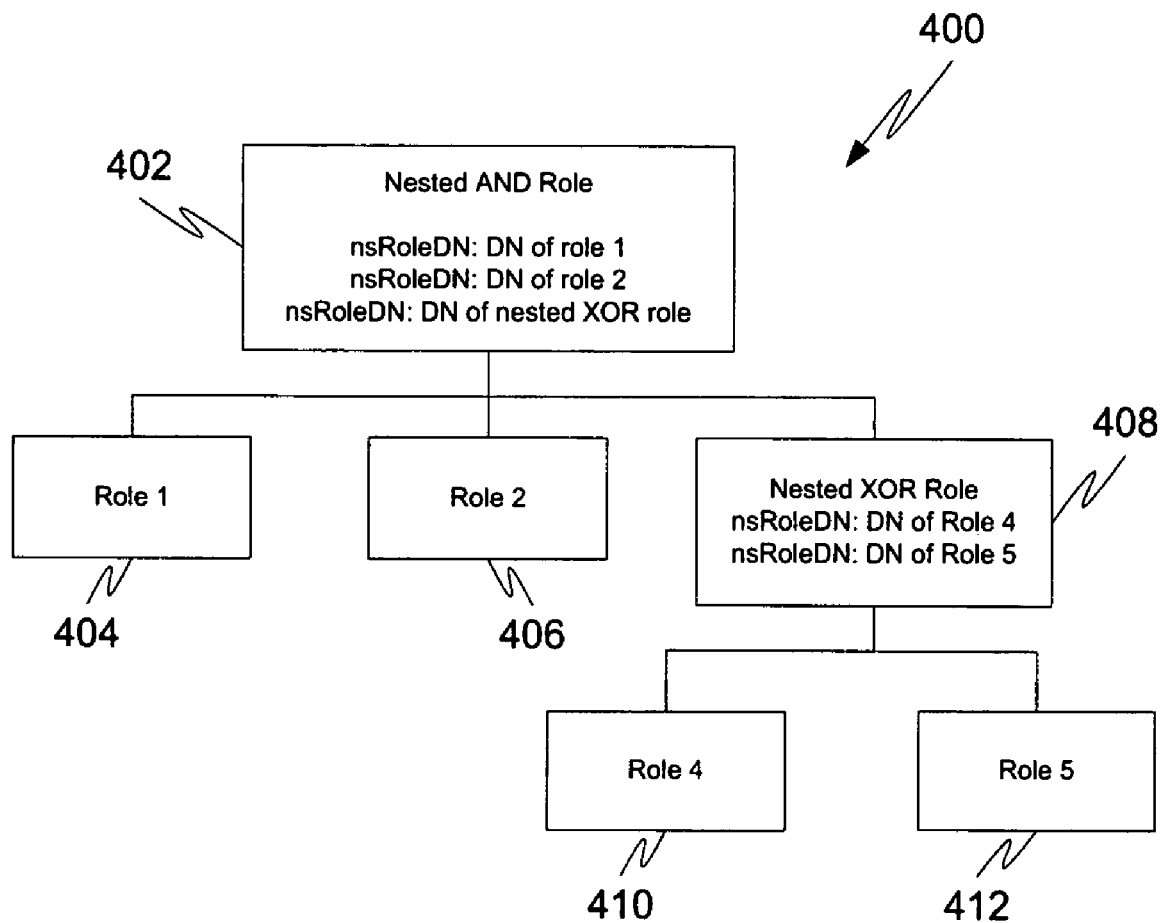
FIG. 4 illustrates a block diagram of another example of a nested AND role of a directory server.

FIG. 4 illustrates a block diagram 400 of another example of a nested AND role of a directory server. In accordance with another embodiment, the nested AND role 402 may comprise further nested roles or other types of nested roles (nested XOR role, nested Exception roles, etc. . . . ). For example, nested AND role 402 may include the DN of role 1 404, role 2 406, and nested XOR role 408. Nested XOR role 408 may include the DN of role 4 410, and role 5 412. An entry possesses the nested XOR role 408 if the entry possesses only one of the roles in the nested XOR role 408. In other words, the entry must possess either role 4 410, or role 5 412.

An entry thus may possess nested AND role 402 if the entry also possess all together role 1 404, role 2 406, and nested XOR role 408. Those of ordinary skills in the art will recognize that many variations and combinations may be utilized based on a specific need.

Figure 5:
FIG. 5 illustrates an example of a nested AND role definition in accordance with one embodiment.
Figure 5:
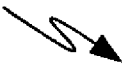

FIG. 5 illustrates an example of a nested AND role definition 500 in accordance with one embodiment. In this example, the nested AND role includes the DN of two roles 502: a legal role and an engineer role. An entry thus may possess the nested AND role if it also possesses (and is a member of the respective groups) the legal role and the engineer role. An entry possessing both legal and engineer role may thus possess the nested AND role, which is defined as a patent agent role.

Figure 6:
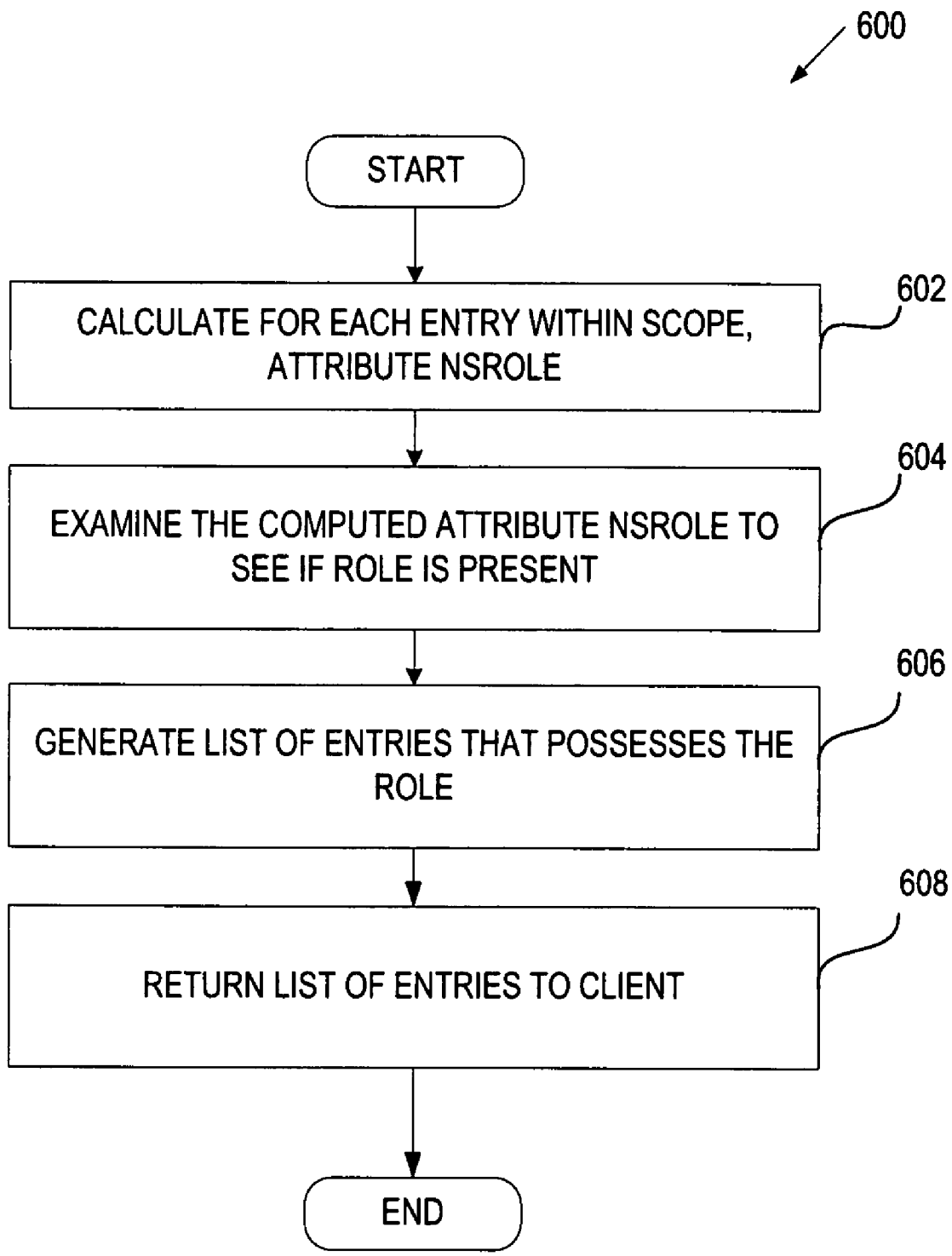
FIG. 6 illustrates a flow diagram of one embodiment of a method for enumerating entries that possess a role in a directory server.

FIG. 6 illustrates a flow diagram of one embodiment of a method for enumerating entries that possess a given role in a directory server. At 602, for each entry within scope, the computed attribute nsRole is calculated. At 604, the entry is examined to see if the role is present. At 606, a list of entries that possess the role is generated. The list is thereafter returned to a client at 608. The client receives the results of the search and enumerates all the entries returned.

Figure 7:
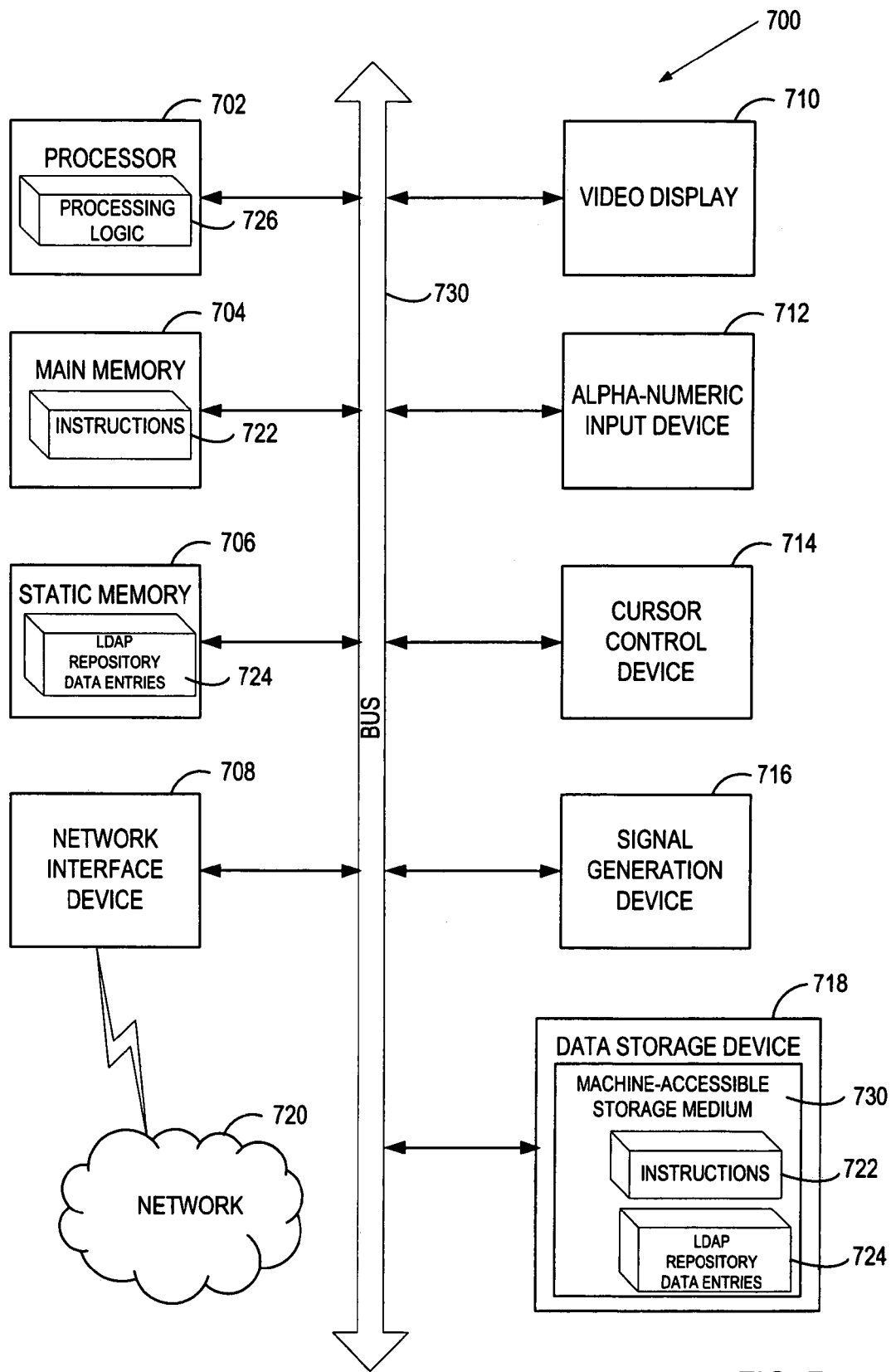
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store LDAP repository data entries 724. LDAP repository data entries 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for dynamically managing groups have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for managing a directory server, the method comprising:
    creating an object class to which a nested AND role comprising at least two constituent roles belongs, the object class defining the nested AND role as a result of a logical AND operation on all of the constituent roles within the nested AND role, the nested AND role declaring itself as a member of the object class by including an identifier of the object class without indicating the logical AND operation;
    defining a plurality of entries in the directory server, at least one of the plurality of entries possessing the nested AND role by possessing all of the constituent roles within the nested AND role;
    querying each of the entries to determine whether the entry possesses the nested AND role by performing the logical AND operation on a plurality of results, each result indicating whether the entry possesses a corresponding one of the constituent roles of the nested AND role; and
    in response to querying, providing entries that possess the nested AND role to a client.

2. The method of claim 1 wherein each role of the nested AND role comprises a plurality of group member attributes, and entries associated with the plurality of the group member attributes in the corresponding role entry.

3. The method of claim 1 further comprising:
    receiving from the client, a request for determining if an entry of the directory server possesses the nested AND role, the request comprising a nsRoleDN attribute for each role.

4. The method of claim 1 wherein the directory server comprises a Lightweight Directory Access Protocol (LDAP) repository.

5. A directory server comprising:
    a processing device;
    a storage device coupled to the processing device, the storage device comprising a directory repository defining a plurality of entries in the directory server, at least one of the plurality of entries possessing a nested AND role by possessing all of a plurality of constituent roles within the nested AND role, the directory repository further defining an object class to which the nested AND role belongs, the object class to define the nested AND role as a result of a logical AND operation on all of the constituent roles within the nested AND role, wherein the nested AND role declares itself as a member of the object class by including an identifier of the object class without indicating the logical AND operation;
    a nested role management module coupled to the processor, the nested role management module to query each of the entries to determine whether the entry possesses the nested AND role, the nested role management module to perform the logical AND operation on a plurality of results, with each result to indicate whether the entry possesses a corresponding one of the constituent roles of the nested AND role, and to provide entries that possess the nested AND role to a client.

6. The directory server of claim 5 wherein the directory server is to define a nested AND role entry corresponding to the nested AND role, the nested AND role entry comprising at least two role entries, each role entry associated with a corresponding role.

7. The directory server of claim 5 wherein each role of the nested AND role comprises a plurality of group member attributes, and entries associated with the plurality of the group member attributes in the corresponding role entry.

8. The directory server of claim 5 wherein the server is to receive from the client, a request for determining if an entry of the directory server possesses the nested AND role, the request comprising a nsRoleDN attribute for each role.

9. The directory server of claim 5 wherein the directory server comprises a Lightweight Directory Access Protocol (LDAP) repository.

10. A computer-readable storage medium, having instructions stored therein, which when executed cause a computer system to perform a method comprising:
    creating an object class to which a nested AND role comprising at least two constituent roles belongs, the object class defining the nested AND role as a result of a logical AND operation on all of the constituent roles within the nested AND role, the nested AND role declaring itself as a member of the object class by including an identifier of the object class without indicating the logical AND operation;
    defining a plurality of entries in the directory server, at least one of the plurality of entries possessing the nested AND role by possessing all of the constituent roles within the nested AND role;
    querying each of the entries to determine whether the entry possesses the nested AND role by performing the logical AND operation on a plurality of results, each result indicating whether the entry possesses a corresponding one of the constituent roles of the nested AND role; and
    in response to querying, providing entries that possess the nested AND role to a client.

11. The computer-readable storage medium of claim 10 wherein the method further comprises:
    defining a nested AND role entry corresponding to the nested AND role, the nested AND role entry comprising at least two role entries, each role entry associated with a corresponding role.

12. The computer-readable storage medium of claim 10 wherein each role of the nested AND role comprises a plurality of group member attributes, and entries associated with the plurality of the group member attributes in the corresponding role entry.

13. The computer-readable storage medium of claim 10 wherein the method further comprises:
    receiving from the client, a request for determining if an entry of the directory server possesses the nested AND role, the request comprising a nsRoleDN attribute for each role.

14. The computer-readable storage medium of claim 10 wherein the directory server comprises a Lightweight Directory Access Protocol (LDAP) repository.

15. The method of claim 1 wherein one or more constituent role of the nested AND role comprises another nested role, another nested AND role, a nested XOR role, or a nested EXCEPTION role.

* * * * *